United States Patent
Short et al.

(10) Patent No.: US 6,752,712 B1
(45) Date of Patent: Jun. 22, 2004

(54) SLOTTED AIR DISTRIBUTION NOZZLE RESTRICTOR ASSEMBLY

(75) Inventors: Sean E. Short, Shoreline, WA (US); Russell S. Westover, Snohomish, WA (US)

(73) Assignee: The Boeing, Company, Chicago, IL (US)

(*) Notice: Subject to any disclaimer, the term of this patent is extended or adjusted under 35 U.S.C. 154(b) by 0 days.

(21) Appl. No.: 10/361,249

(22) Filed: Feb. 10, 2003

(51) Int. Cl.⁷ .............................................. B64D 13/00
(52) U.S. Cl. ..................................... 454/76; 244/118.5
(58) Field of Search ............................. 454/70, 71, 73, 454/74, 75, 76; 244/118.5

(56) References Cited

U.S. PATENT DOCUMENTS

| | | | |
|---|---|---|---|
| 4,509,681 A | * 4/1985 | Kogut | 237/53 |
| 4,750,087 A | 6/1988 | Carpenter et al. | |
| 5,472,645 A | * 12/1995 | Rock et al. | 261/79.1 |
| 6,450,876 B2 | 9/2002 | Elliot | |

\* cited by examiner

*Primary Examiner*—Derek S. Boles
(74) *Attorney, Agent, or Firm*—Ann K. Galbraith, Esq.

(57) ABSTRACT

A restrictor plate assembly (46) for an air distribution nozzle (16) of an aircraft (13) includes a restrictor plate (84) and a support structure (80). The restrictor plate (84) has an outer periphery (66) with multiple notches (68). The support structure (80) is coupled to and supports the restrictor plate (84).

20 Claims, 3 Drawing Sheets

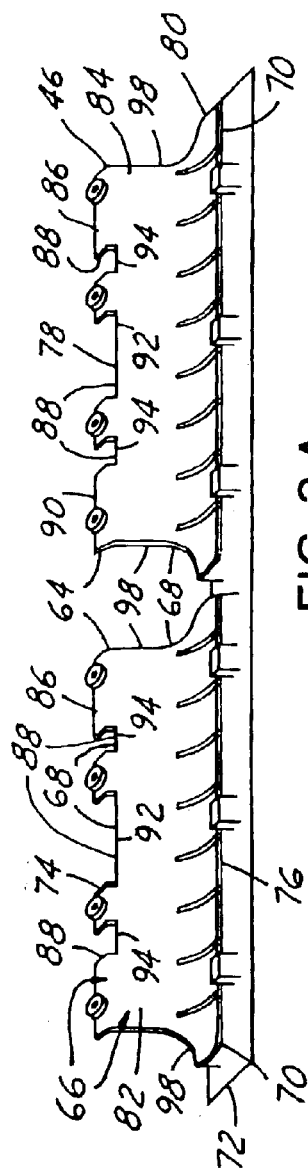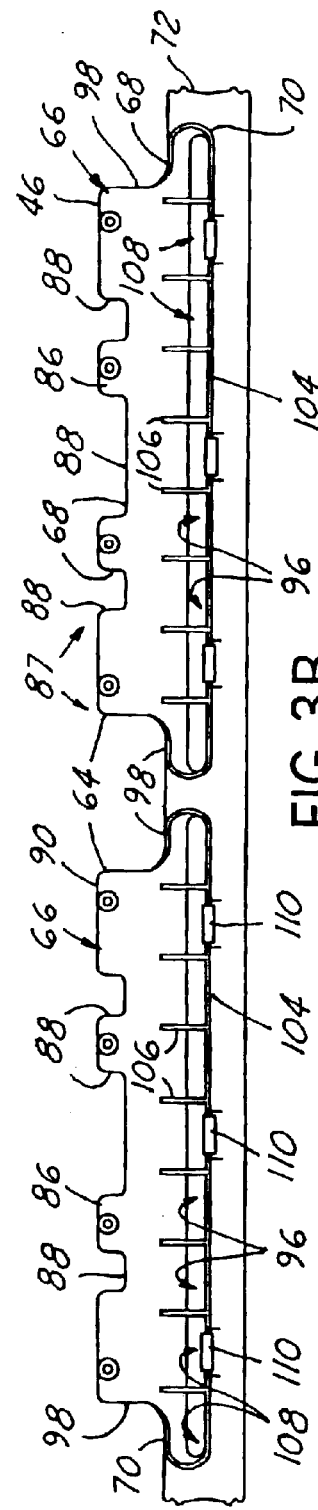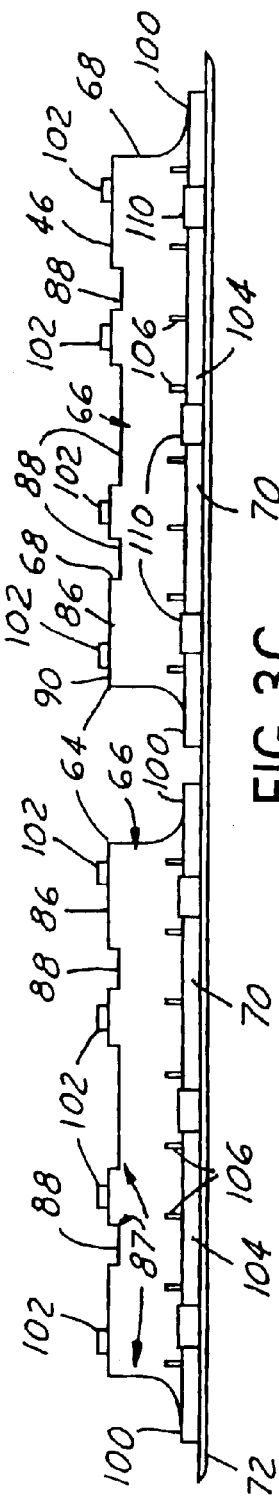

SLOTTED AIR DISTRIBUTION NOZZLE RESTRICTOR ASSEMBLY

TECHNICAL FIELD

The present invention relates generally to aeronautical vehicle air distribution systems, and more particularly, to an apparatus and system for uniformly distributing air from confined areas within an aircraft cabin.

BACKGROUND OF THE INVENTION

In current commercial aircraft, air is distributed within an aircraft cabin to create a comfortable setting for passengers traveling therein. The distributed air may contain fresh amounts of oxygen and other known gases and adjust the internal temperature of the aircraft so as to provide a pleasant breathing and climate-controlled atmosphere within the aircraft cabin.

It is especially desirable within a commercial aircraft to uniformly distribute the air throughout the aircraft cabin. Uniform distribution of air creates a cabin environment having uniform air composition, velocity, and temperature consistencies. Also, uniform air distribution prevents passengers from experiencing areas within the cabin having associated undesirable aspects. Undesirable aspects may for example include airflow pressure differentials, uncomfortable temperatures, fluctuations in airflows or temperatures, or other undesirable known aspects. Airflow pressure differentials may cause passengers to experience undesired gusts of air or experience an undesirable constant airflow, possibly resulting in the passenger perceiving that a draft exists.

A typical cabin air distribution system of an aircraft includes a series of sidewall and overhead nozzle assemblies that extend fore and aft along a length of the cabin. Each nozzle assembly includes a plenum defining a plenum volume that is coupled to a spud assembly. The spud assembly directs airflow from air ducts to the plenum. The plenum includes a restrictor plate, in general, having one of two different configurations. The restrictor plate evenly distributes air across the length of the plenum to provide uniform distribution of air within the cabin.

A first configuration of the restrictor plate includes an obtusely angled rectangular plate, which extends within the plenum volume and obstructs direct flow of the air from directly exiting a plenum output opening. A second configuration of the restrictor plate is similar to the first configuration except that the rectangular plate is in the form of a screen having a large set of holes that are evenly distributed across the entire restrictor plate. Although, the second configuration has a large enough number of holes to prevent the air from primarily exiting at ends of the plenum, a ratio limit of cross-sectional area of the plate relative to cross-sectional area of the holes is not exceeded to prevent the air from exiting directly out a center of the plenum almost as though the restrictor plate did not exist.

Space available for the series of nozzle assemblies is becoming limited in newly designed aircraft, such that existing nozzle assemblies and restrictor plates designs no longer are capable of providing an even distribution of airflow. As the plenum volume is decreased in size the existing restrictor plates no longer serve their intended purpose and air tends to exit at ends of the plenums, due to a greater dynamic pressure of air relative to an existing static pressure of air, creating "dead spots" or areas with no airflow. With increased size and number of dead spots comes an increased amount of areas with undesirable aspects.

It is therefore desirable to provide a nozzle assembly that is capable of providing a uniform air distribution output without generation of dead spots for an aircraft with confined available air distribution nozzle space. It is also desirable for the nozzle assembly to have a relatively simple design and be relatively inexpensive to manufacture.

SUMMARY OF THE INVENTION

The present invention provides an apparatus and system for uniformly distributing air from confined spaces within an aircraft cabin. A restrictor plate assembly is provided for an air distribution nozzle of an aircraft The restrictor plate assembly includes a restrictor plate and a support structure. The restrictor plate has an outer periphery with multiple notches. The support structure is coupled to and supports the restrictor plate.

One advantage of the present invention is that it provides an air distribution nozzle that is capable of being utilized within confined areas of an aircraft and at the same time provides an evenly distributed airflow along an output length of the nozzle. In so doing, the present invention unlike the prior art is capable of being used in modernly designed aircraft where available air distribution nozzle space is limited.

Another advantage of the present invention is that it provides design versatility in that output air distribution may be easily adjusted by adjusting notches within the restrictor plate.

Furthermore, the present invention can also be effective in reducing noise associated with airflow exiting the nozzle.

Moreover, the present invention provides a simple inexpensive method of evenly distributing air throughout an aircraft cabin.

The present invention itself, together with further objects and attendant advantages, will be best understood by reference to the following detailed description, taken in conjunction with the accompanying drawing.

BRIEF DESCRIPTION OF THE DRAWINGS

FIG. 3A is a perspective view of a restrictor plate assembly in accordance with an embodiment of the present invention;

FIG. 3B is a top view of the restrictor plate assembly in accordance with another embodiment of the present invention;

FIG. 3C is a side front view of the restrictor plate assembly in accordance with another embodiment of the present invention.

DETAILED DESCRIPTION OF THE PREFERRED EMBODIMENT

Figure 1:
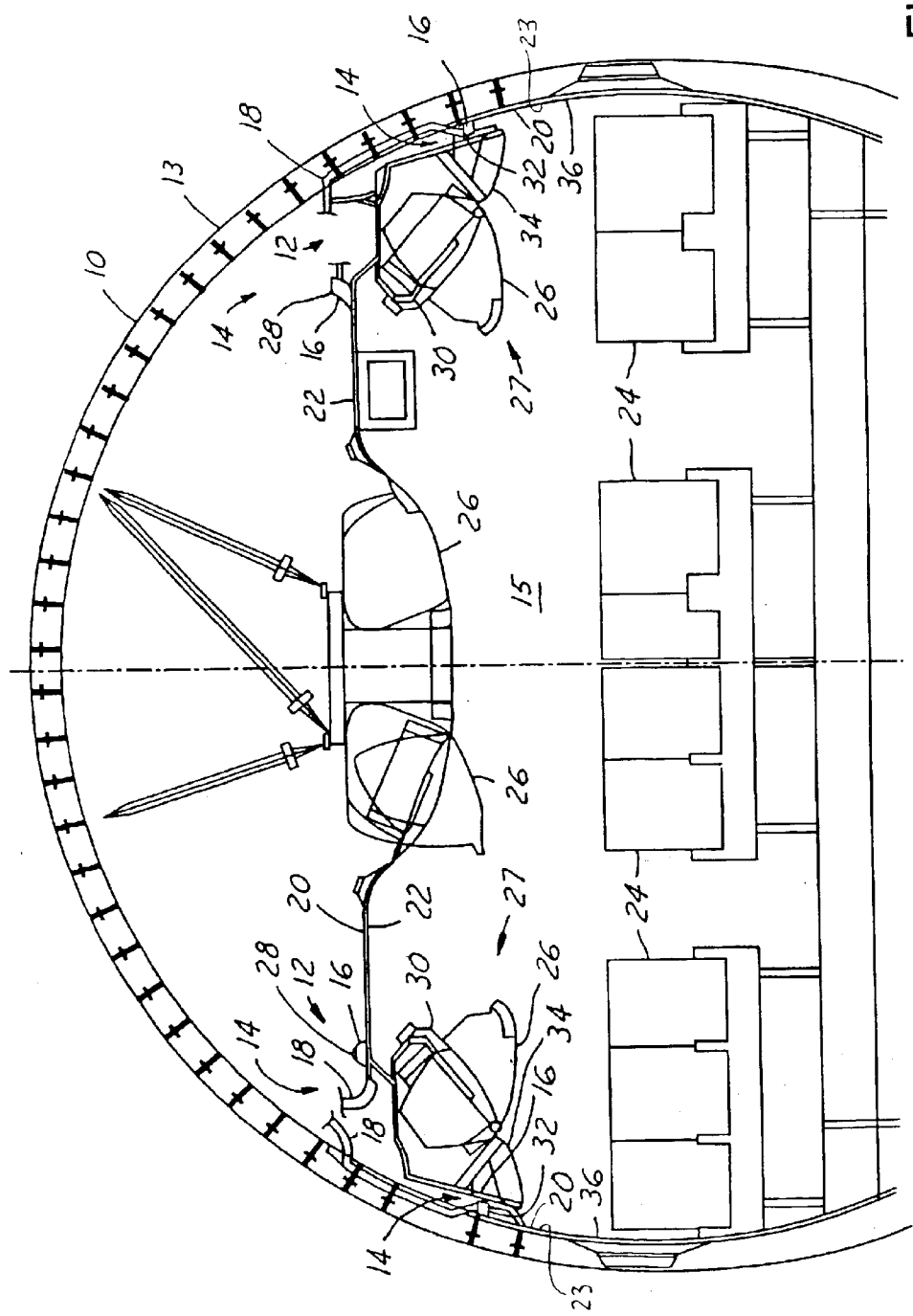
FIG. 1 is a cross-sectional view of an aircraft fuselage having multiple uniform air distribution systems in accordance with an embodiment of the present invention.

In each of the following figures, the same reference numerals are used to refer to the same components. While the present invention is described with respect to an apparatus and system for uniformly distributing air from confined areas within an aircraft cabin, the present invention may be adapted for various applications including various air distribution systems, such as ground-based vehicles, aeronautical vehicles, watercraft, and other applications known in the art that require distribution of air.

In the following description, various operating parameters and components are described for one constructed embodiment. These specific parameters and components are included as examples and are not meant to be limiting.

Referring now to FIG. 1, a cross-sectional view of an aircraft fuselage 10 having multiple uniform air distribution systems 12 for an aircraft 13 in accordance with an embodiment of the present invention is shown. The aircraft 13 has limited space available for the air distribution systems 12, which reside in confined areas 14. The distribution systems 12 distribute air throughout an aircraft cabin 15 and include multiple air distribution nozzles 16 receiving air from an air supply source (not shown) via ductwork 18. The nozzles 16 have geometry to enable them to be used in the areas 14. The nozzles evenly distribute the air in a fore and aft direction along length of the aircraft 13 without generation of dead spots. The nozzles 16 are coupled to various internal aircraft panels 20, such as ceiling panels 22 and sidewall panels 23.

As shown, the cabin 15 contains multiple seating systems 24, a series of overhead compartments 26, and an air distribution nozzle configuration 27. The configuration 27 consists of a first series of air distribution nozzles 28 that are coupled to the ceiling panels 22 and are located above overhead baggage compartments 30. A second series of air distribution nozzles 32, referred to as under bin nozzles, are located between an outboard passenger service unit (PSU) panel 34 and a fuselage wall 36 to also provide airflow to the cabin 15. In using the first series of nozzles 28, the present invention improves the even distribution of air, thus decreasing the potential for cabin areas having associated undesirable aspects.

The air distribution nozzle configuration 27, as shown in FIG. 1, is intended for example purposes only. Any number of air distribution nozzles may be used; the nozzles may be in various locations and be of varying size, shape, and style.

Figure 2:
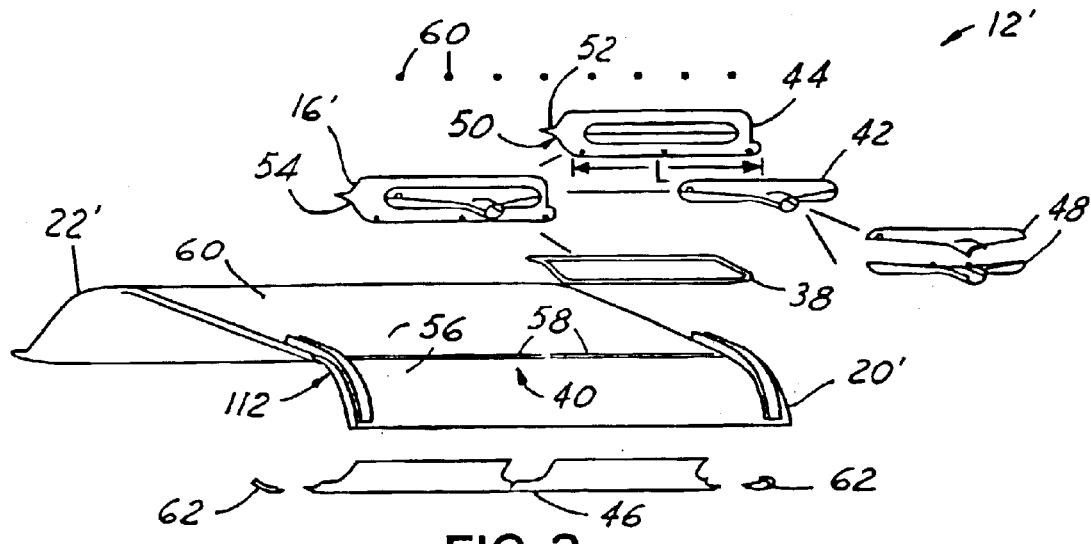
FIG. 2 is an isometric exploded perspective assembly diagram of a uniform air distribution system in accordance with an embodiment of the present invention.

Referring now to FIG. 2, a perspective assembly diagram of a uniform air distribution system 12' in accordance with an embodiment of the present invention is shown. The distribution system 12' includes multiple nozzles 16' (only two are shown) that are coupled to internal aircraft panels 20' (only one is shown), which are represented by a ceiling panel 22'. A nozzle gasket 38 resides between each of the nozzles 16' and the panels 20', providing an air seal 40 therein.

Each nozzle 16' includes a spud assembly 42, a plenum 44, and a restrictor plate assembly 46. The spud assembly 42 includes a pair of spud halves 48 that are coupled together. The spud halves 48 may be snapped together, fastened together, or coupled together by various methods known in the art. Air from the ductwork 18 enters the spud assembly 42 and is at least partially directed by the spud assembly 42 across length L of the plenum 44. The plenum 44 has an internal plenum volume 50 and is coupled to the spud assembly 42 via an outer perimeter lip 52. A panel surface 54 of the plenum 44 is formed to at least approximately match a corresponding plenum surface 56 of the panel 20' to aid in preventing air leaks therebetween. During manufacturing of the distribution system 12', the restrictor plate assembly 46 is slid through slots 58 in the panel 20' into the plenum 44 to reside in the plenum volume 50. The restrictor plate assembly 46 is coupled to the plenum 44 via fasteners 60 and endcaps 62. Of course, the restrictor plate assembly 46 may be coupled to the plenum 44 or may be held to reside within the plenum volume 50 using other fasteners or techniques known in the art. The fasteners 60 also couple the nozzle 16' to the panel 20'.

Referring now to FIGS. 3A–C, perspective, top, and side front views of the restrictor plate assembly 46 are shown in accordance with an embodiment of the present invention. The restrictor plate assembly 46 includes one or more restrictor plates 64, each of which having an outer periphery 66 with multiple notches 68. Each restrictor plate 64 has a corresponding nozzle 16' and a support structure 70 providing support and rigidity to the restrictor plate. A surface mounting plate 72 is coupled to the support structures 70 and acts as a cover over the restrictor plate assembly 46 and a respective slot 58.

In the embodiment of FIGS. 3A–C, the restrictor plate assembly 46 includes a first restrictor plate 74 having a first support structure 76 and a second restrictor plate 78 having a second support structure 80. The restrictor plates 74 and 78, the support structures 76 and 80, and the surface mounting plate 72 are integrally formed together. The first restrictor plate 74 has a first lateral sidewall 82 and the second restrictor plate 78 has a second lateral sidewall 84. The sidewalls 82 and 84 are in line and in series with each other.

The outer periphery 66 includes an extension member 86 and a notch pattern 87. Although the extension member 86 is shown as being integrally formed with the restrictor plate 64, it may be formed separate from and be coupled to the restrictor plate 64. The extension member 86 includes multiple nozzle side notches 88 along a nozzle side 90 of the restrictor plate 64. In a preferred embodiment of the present invention each restrictor plate 64 has three nozzle side notches: a centrally located elongated direct flow notch 92 and a pair of off-center notches 94. The side notches 88 increase airflow through corresponding distribution areas 96 of the nozzle 16', preventing development of dead spots from the areas 96. Since there is increased airflow, in general, across the extension member 86 due to the side notches 88, end notches or end cutouts 98 are provided in the restrictor plates 64 10 increase airflow to ends 100 of the support structures 80 also preventing dead spots from forming in corresponding areas of the cabin 15 associated with the ends 100.

The extension members 86 are coupled to the plenums 44 by the fasteners 60 and separated from the plenums 44 by plenum coupling separators 102. The fasteners 60 and the separators 102 retain position of the restrictor plate assembly 46 in the plenum volume 50. The separators 102 provide a separating cushion between the plenums 44 and the extension members 86, preventing generation of noise therebetween. The separators 102 may be in the form of grommets, washers, or other separators known in the art. Also, the separators 102 may be formed of various materials known in the art including elastomeric materials, such as rubber, and rigid materials, such as steel and plastic.

Although, the restrictor plate assembly 46 is shown having two restrictor plates, the assembly may have any number of restrictor plates and corresponding support structures. The support structures may have various form and style as known in the art.

The support structures 80 include one or more main pockets 104 that have multiple ribs 106. The ribs 106 form multiple air output openings 108 and act as flow straighteners. The main pockets 104 act as guides when sliding the restrictor plate assembly 46 into the panel 20' and prevent movement between the restrictor plate assembly 46 and the panel 20'. The main pockets 104 have multiple fastening members 110 that act as clips, which fasten the main pockets 104 to the panel 20'. The main pockets 104 may be fastened to the panel 20' using other techniques known in the art.

The surface mounting plates 72 may be in the form of a grille or have grille or screen aspects to prevent objects from entering the plenum volume 50 from within the cabin 15. The surface mounting plates 72 are contoured as to match interior surfaces 112 of the panel 20' and are esthetically pleasing.

The restrictor plate assembly 46 of FIGS. 3A–C, illustrates one example of a notch pattern 87 that may be used. The restrictor plate assembly 46 may be adjusted for various applications. The quantity of notches may be varied as well as varying size and shape of the notches. There may also be any number of restrictor plates, which may or may not be in series or in alignment with each other. Thus, the present invention is versatile in that it may be easily adjusted to be applied to various applications.

Figure 4:
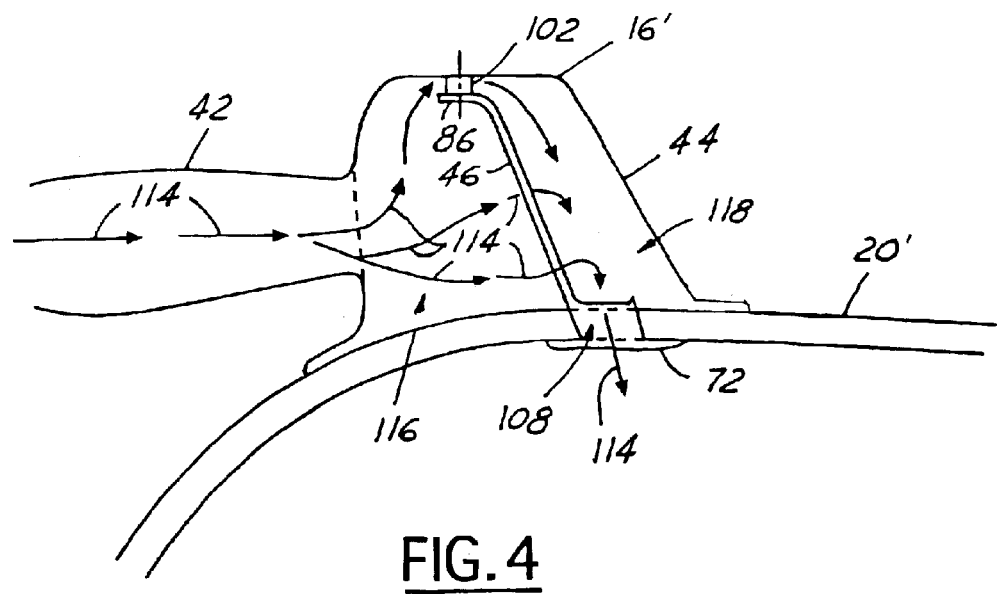
FIG. 4 is a cross-sectional side view of an air distribution nozzle illustrating airflow through the nozzle in accordance with an embodiment of the present invention.

Referring now also to FIG. 4, a cross-sectional side view of the air distribution nozzle 16' illustrating airflow through the nozzle 16' in accordance with an embodiment of the present invention is shown. In operation, air, represented by arrows 114, flows into the spud assembly 42 and is directed across the plenum 44. Once inside the plenum 44 the air 114 flows at various rates around the outer periphery 66. Airflow is increased in areas within the plenum volume 50 associated with the notches 68 to compensate for relatively low airflow in those areas. In other words, the size, shape, and position of the notches 68 convert differences in airflow on an intake side 116 of the plenum 44 into an approximately constant airflow in an output side 118 of the plenum 44 across length L. Upon flowing around the outer periphery 66, the air 114 is than evenly distributed out the surface mounting plate 72 through the openings 108.

The present invention provides a restrictor plate assembly for a uniform air distribution system that is capable of being utilized in confined areas of an aircraft. The restrictor plate assembly of the present invention provides uniform air distribution within an aircraft cabin, has a simple design, and is inexpensive to manufacture.

The above-described apparatus and method, to one skilled in the art, is capable of being adapted for various applications and systems known in the art. The above-described invention can also be varied without deviating from the true scope of the invention.

What is claimed is:

1. A restrictor plate assembly for an air distribution nozzle of an aircraft comprising:
   at least one restrictor plate having an outer periphery, said outer periphery comprising a plurality of notches; and
   at least one support structure coupled to and supporting said at least one restrictor plate.

2. An assembly as in claim 1 wherein said at least one restrictor plate comprises:
   a first restrictor plate;
   a second restrictor plate; and
   a restrictor plate coupling member coupling said first restrictor plate to said second restrictor plate.

3. An assembly as in claim 2 wherein said restrictor plate coupling member is formed from said first restrictor plate being integrally formed with said second restrictor plate.

4. An assembly as in claim 2 wherein said restrictor plate coupling member is a surface mounting plate.

5. An assembly as in claim 4 wherein said surface mounting plate comprises a grille.

6. An assembly as in claim 2 wherein said first restrictor plate is in series with said second restrictor plate.

7. An assembly as in claim 2 wherein said first restrictor plate has a first lateral sidewall that is in line with a second lateral sidewall of said second restrictor plate.

8. An assembly as in claim 1 wherein said plurality of notches comprise:
   at least one nozzle side notch; and
   at least one end cutout.

9. An assembly as in claim 8 wherein said at least one nozzle side notch comprises:
   at least one centrally located elongated direct flow notch; and
   at least one pair of off-center notches.

10. An assembly as in claim 1 wherein said outer periphery comprises an extension member having said plurality of notches.

11. An assembly as in claim 10 wherein said at least one restrictor plate is integrally formed with and is angled relative to said extension member.

12. An assembly as in claim 1 wherein said at least one support structure comprises at least one main pocket having a plurality of ribs.

13. An assembly as in claim 12 wherein said main pocket comprises at least one fastening member.

14. An assembly as in claim 1 wherein said at least one restrictor plate comprises at least one plenum coupling separator.

15. An air distribution nozzle for an aircraft comprising:
   a spud assembly;
   a restrictor plate assembly comprising;
      at least one restrictor plate having an outer periphery, said outer periphery comprising a plurality of notches; and
      at least one support structure coupled to and supporting said at least one restrictor plate; and
   a plenum coupled to said restrictor assembly and said spud assembly.

16. An uniform air distribution system for an aircraft comprising:
   a plurality of air distribution nozzles comprising;
      a plurality of spud assemblies;
      a plurality of restrictor plate assemblies, each assembly comprising;
         at least one restrictor plate having an outer periphery, said outer periphery comprising a plurality of notches; and
      at least one support structure coupled to and supporting said at least one restrictor plate; and
      a plurality of plenums coupled to said restrictor assembly and said spud assembly; and
   at least one internal aircraft panel coupled to said plurality of air distribution nozzles.

17. A system as in claim 16 further comprising a plurality of fasteners coupling said plurality of air distribution nozzles to said at least one internal aircraft panel.

18. A system as in claim 16 wherein said at least one restrictor plate is coupled to said at least one internal aircraft panel via a pair of endcaps.

19. A system as in claim 16 wherein said at least one support structure comprises a plurality of fastening members that are coupled to said at least one internal aircraft panel.

20. A system as in claim 16 further comprising at least one plenum gasket between said plurality of plenums and said at least one internal aircraft panel.

* * * * *